(12) United States Patent
Winterberg et al.

(10) Patent No.: US 6,717,072 B1
(45) Date of Patent: Apr. 6, 2004

(54) BED BALANCE

(75) Inventors: Matthias Winterberg, Hamburg (DE); Claus-Dieter Sievers, Hamburg (DE)

(73) Assignee: Seca GmbH, Hamburg (DE)

( * ) Notice: Subject to any disclaimer, the term of this patent is extended or adjusted under 35 U.S.C. 154(b) by 134 days.

(21) Appl. No.: 10/111,329

(22) PCT Filed: Sep. 5, 2000

(86) PCT No.: PCT/EP00/08665
§ 371 (c)(1), (2), (4) Date: Apr. 23, 2002

(87) PCT Pub. No.: WO01/31302
PCT Pub. Date: May 3, 2001

(30) Foreign Application Priority Data

Oct. 26, 1999 (DE) .......................... 199 52 729

(51) Int. Cl.⁷ .............................. G01G 19/02
(52) U.S. Cl. ................ 177/126; 177/130; 177/144; 177/146
(58) Field of Search ................ 177/126, 130, 177/144, 146

(56) References Cited

U.S. PATENT DOCUMENTS

| | | | |
|---|---|---|---|
| 3,722,611 A | 3/1973 | Tirkkonen | 177/144 |
| 3,887,022 A | 6/1975 | Stanev | 177/146 |
| 3,961,675 A | 6/1976 | Siegel | 177/126 |
| 4,033,420 A | 7/1977 | De Masters | 177/126 |
| 5,086,856 A | * 2/1992 | Haggstrom | 177/126 |
| 5,861,582 A | 1/1999 | Flanagan et al. | 177/144 |
| 5,990,423 A | * 11/1999 | Ashpes et al. | 177/144 |
| 6,124,554 A | * 9/2000 | Muckle et al. | 177/126 |
| 6,518,520 B2 | * 2/2003 | Jones et al. | 177/144 |

FOREIGN PATENT DOCUMENTS

| | | |
|---|---|---|
| DE | 20 17 250 A | 11/1970 |
| DE | 72 25 247 U | 10/1973 |
| JP | 0570196117 | 12/1982 |

* cited by examiner

*Primary Examiner*—Randy W. Gibson
(74) *Attorney, Agent, or Firm*—Nixon & Vanderhye P.C.

(57) ABSTRACT

The invention relates to a bed scale with a plurality of measuring feet which each support one leg of the bed and are provided with a force transducer which delivers a signal representing a weight force acting on the measuring foot and furthermore with an evaluation device which is connected to the transmission devices in the measuring feet for receiving the signal in order to deliver a result dependent on the weight force bearing thereon. In order to improve the ease of handling and the user-friendliness it is provided according to the invention that each measuring foot has an angle lever arrangement displaceable on the floor on sliding elements, preferably rollers (5), which swivellably bears at a shorter lever arm (8) a rocker (1) which can be pushed laterally onto the leg of the bed standing on the floor to accommodate it, the suspension mounting of the rocker (1) at the shorter lever arm (8) and the longer activating lever (2) of the angle lever arrangement being arranged such that, upon the pressing down of the activating lever (2), the rocker (1) is lifted and its suspension mounting (9) is moved beyond the dead centre in which the suspension mounting (9) of the rocker (1) lies vertically above the sliding elements (5) of the angle lever arrangement. As a result the bed can, by simple working of the activating lever, be brought into the lifted position for measurement on the measuring feet.

8 Claims, 3 Drawing Sheets

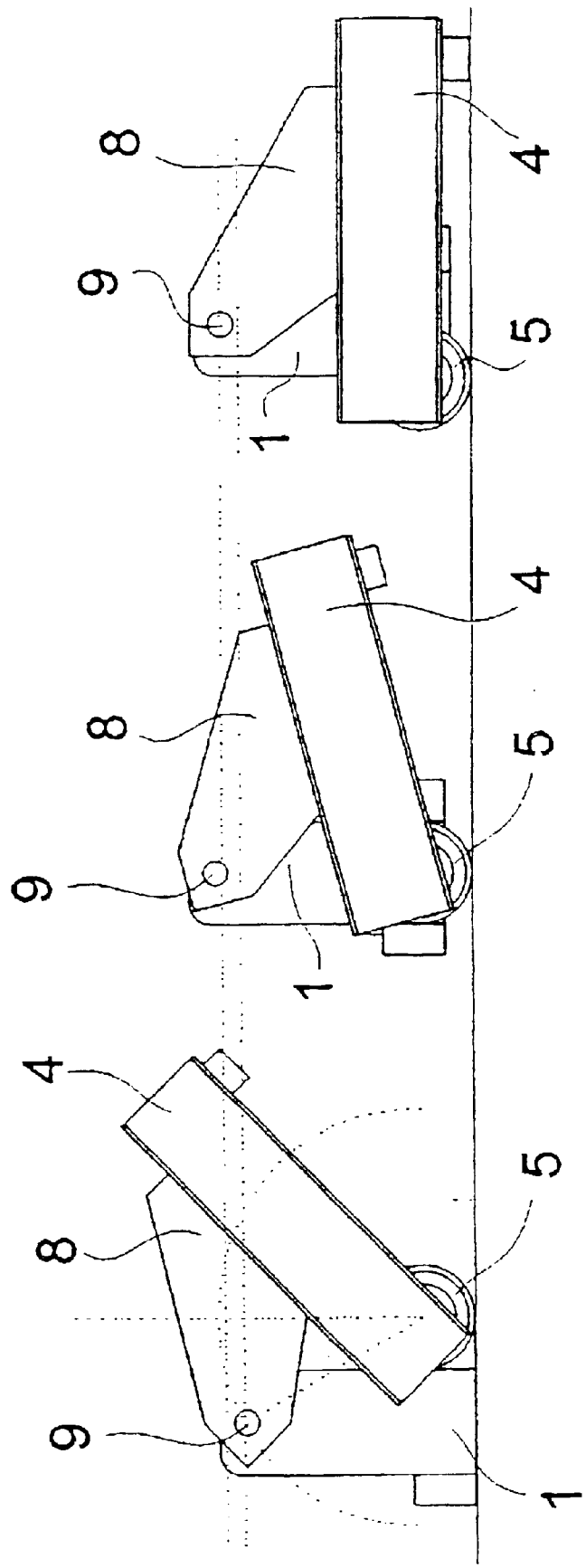

BED BALANCE

This application is the US national phase of international application PCT/EP00/08665 filed Sep. 5, 2000, which designated the US.

The invention relates to a bed scale for the medical field, with which beds can be weighed.

Such bed scales have as a rule four measuring feet each of which can support one leg of the bed, in particular for example a bed roller of a movable bed, and is provided with a force transducer or sensor. The force transducer, for example a weighing cell, delivers a signal which represents the weight force acting on the measuring foot. The measuring feet have transmission devices for signal transmission to an evaluation device which receives and evaluates their signals. In many cases the evaluation device is designed as a reading and operating device which receives the signals of the measuring feet and is thus prepared to deliver a reading which depends on the weight force bearing on the measuring feet. The reading and operating device can be prepared for example such that the weight of the bed can be subtracted and then only the weight of the patient is displayed.

Such bed scales are known for example from DE 72 25 247 U1. The bed scale has four measuring feet each with a receiving means adapted to the outer shape of a bed roller. In order to employ and use the bed scale the bed is lifted and one measuring foot is placed under each bed roller and the bed is then lowered onto the measuring feet. For this purpose either the bed has to be lifted as a whole, which requires an expensive lifting device, or it has to be lifted firstly at one end and the measuring feet placed under the bed rollers at this end and then lifted at the opposite end and the measuring feet placed under the remaining bed rollers. With both alternatives the placing of the bed on the measuring feet of the bed scales is very laborious and time-consuming for the staff. The same difficulties result for beds without bed rollers, which likewise have to be lifted in order to be placed on the measuring feet.

With other bed scales the measuring feet are each provided with a ramp onto which the bed rollers can be pushed. Firstly the bed is pushed such that all four bed rollers are swivelled into a straight position suitable for pushing-on. The ramps of the measuring feet then have to be positioned at the bed rollers and then the bed is pushed over the ramps simultaneously onto the four measuring feet. Expenditure of a considerable force may be required to push the bed onto the measuring feet. Furthermore the measuring feet may slip during the pushing-on or one of the bed rollers swivel, which makes the repetition of the entire process necessary.

The known bed scales thus have the disadvantage that the placing of the legs of the bed onto the measuring feet is associated with considerable difficulties. Furthermore, the possible difficulties which may occur while placing the bed onto the measuring feet are such that, generally, it is not possible for a patient to be in it. Furthermore, if the measuring feet are not wholly precisely positioned, and they do not correspond wholly precisely to the position of the four legs or the bed rollers at the legs, lateral forces may act on the measuring feet when the bed is placed onto the measuring feet. Such lateral forces can affect the measurements of the force transducer and thus distort the results delivered by the bed scale.

It is the object of the present invention to produce bed scales which are easy to handle and measure precisely.

The characterizing features of patent claim 1 in conjunction with its preamble serve to achieve this object. Advantageous embodiments of the invention are stated in the dependent claims.

According to the present invention each measuring foot is designed as a kind of angle lever which can be moved along the floor on sliding elements, preferably rollers. A rocker is swivellably attached to the shorter lever arm and is adapted to be able to be pushed laterally onto a leg of the bed standing on the floor to engage it. The rocker can be designed for example such that it can be pushed laterally onto a bed roller of the leg to accomodate it for lifting while the bed roller is resting on the floor. In order to push the rocker onto the leg the angle lever arrangement is pushed forward on its sliding elements onto the leg until the rocker engages in form-locking manner at parts of the leg, in order to lift same. The rocker can for example be designed such that it can be pushed onto a bed roller at the bottom end of the leg standing on the floor, and that it, in its pushed-on state, encompasses parts of the lower hemisphere of the bed roller such that the latter can be lifted by the rocker. The suspension mounting of the rocker on the shorter lever arm and the longer activating lever of the angle lever arrangement and its sliding elements are arranged such that, when the activating lever is pressed down, the rocker is lifted by the shorter lever arm and its suspension mounting moved out over the dead centre, in which the suspension mounting of the rocker lies vertically above the sliding elements of the angle lever arrangement. In this way, the angle lever arrangement with lifted rocker reaches a stable position beyond the dead centre, in which the leg of the bed is supported by the rocker alone. In the stable end-position the angle lever arrangement rests on the floor with at least one further point beside the slide elements, such that a secure position of the measuring foot is achieved. A force transducer, for example a weighing cell, is provided in each measuring foot, which delivers a signal from which a measurement for the weight force acting on the rocker can be determined. The signals of the force transducer are transmitted to the evaluation device via transmission devices either with cables or without wires.

As the activating lever can be designed clearly longer than the shorter lever arm, the activation of the angle lever arrangement for lifting the bed rollers is possible for the staff with little expenditure of force.

Furthermore, incorrect positioning of the legs on the measuring feet cannot occur, as the rocker can be pushed laterally onto a leg of the bed while the leg is standing on the floor, to be able to grip this leg to lift it. Because the sliding elements of the measuring foot move under the leg of the bed during the lifting process, lateral forces cannot develop, as the measuring feet are movable in cross direction during the lifting process.

In principle the bed scales can be used for all types of beds, including simple beds which have their legs standing on the floor without bed rollers. Many beds in the medical field are provided with bed rollers on their legs such that they are movable. It is preferred for these beds that the measuring feet are designed such that they can accommodate the bed rollers. It is not necessary with the present bed scales that all bed rollers are firstly aligned in a uniform direction, as the measuring feet can also be pushed onto slanted or inclined bed rollers.

With the bed scales according to the invention the placing of the bed onto the measuring feet is made considerably easier and also requires no further lifting devices. The ease of handling and user-friendliness of the bed scales are considerably improved thereby.

The measuring feet can be placed in succession at the four bed rollers and lifted. The activation force for each lever process is small due to the length of the activating lever. The bed scales can therefore be installed by all nursing staff. Furthermore, when lifting the bed, it needs to be lifted only slightly such that the rocker comes away from the floor; with such a slight lifting a patient can also be in the bed during the lifting. Furthermore no moving of the bed is necessary with the scales according to the invention. In addition the bed rollers do not need to be set in a uniform direction beforehand, as each measuring foot can also be pushed onto a bed roller which is inclined and this can then be lifted.

The invention is described in the following using an embodiment in the drawings, in which:

FIGS. 2–4 show lateral views of successive positions of the lower part of the angle lever arrangement of a measuring foot when lifting a bed;

Figure 1:
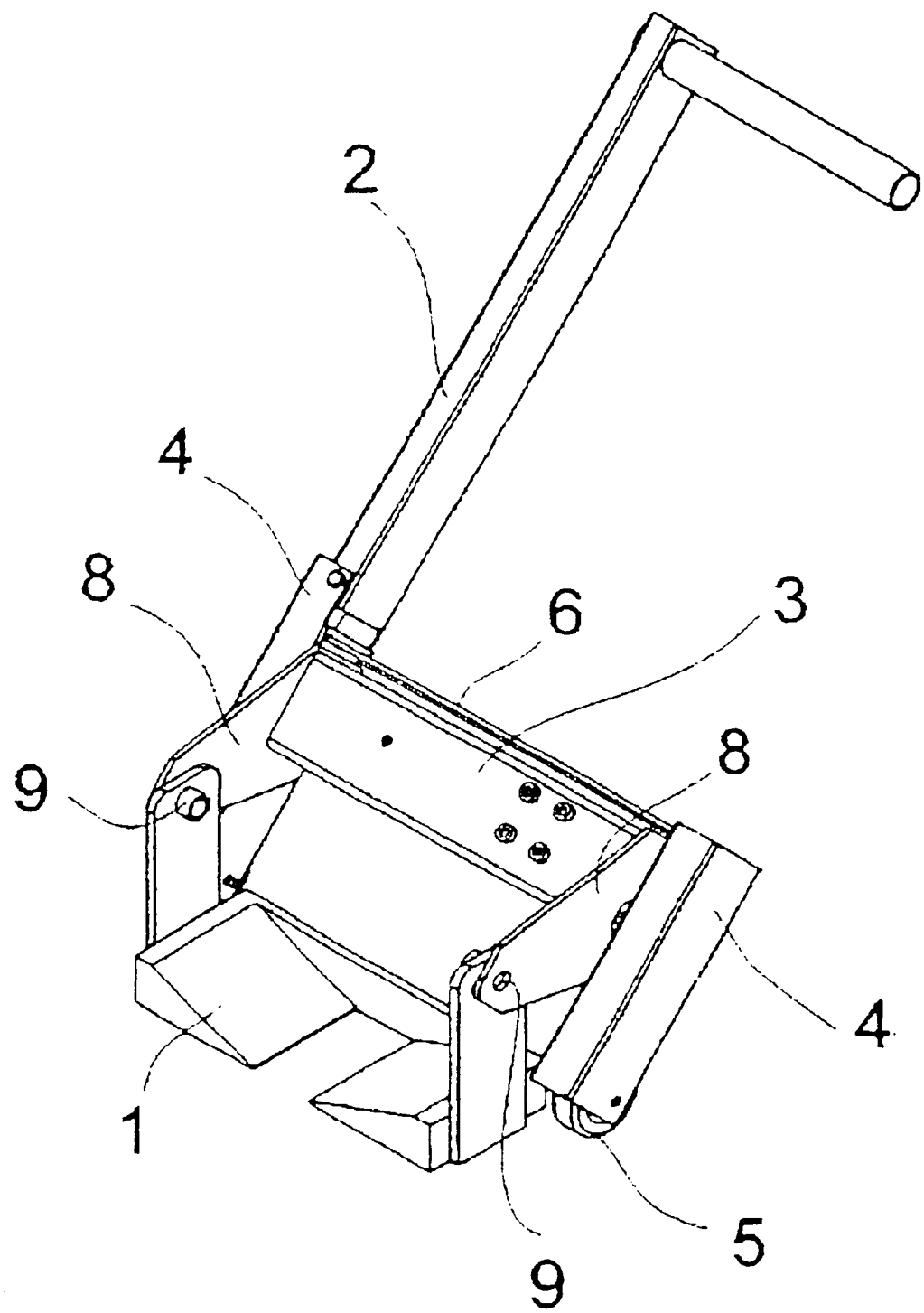
FIG. 1 shows a schematic perspective representation of a measuring foot for bed scales of the present invention.

FIG. 1 shows a schematic representation of a measuring foot. The measuring foot has an angle lever arrangement which has shorter lever arms 8 and an activating lever 2, which is extended via frame parts 4 which carry rollers 5 at their lower ends. A suspension mounting 9 for a rocker 1 is provided on the shorter lever arms 8 at their ends which are remote from the activating lever 2. The rocker 1 has two wedge-shaped supports which are arranged opposite each other and at a distance from each other such that the wedge-shaped supports can be pushed under lower peripheral areas of a bed roller standing on the floor in order to accommodate this. The wedge-shaped supports of the rocker 1 are connected to each other via a common back wall. As an alternative to the wedge-shaped supports, for example mandrels or rods can also be used as supports. The rocker 1 is swivellable in the suspension mounting 9 against the shorter lever arm 8.

The arrangement of the suspension mounting 9 of the rocker 1 on the shorter lever arm 8 and the positions of the rollers 5 of the angle lever arrangement are designed such that, when the activating lever 2 swivells out of an upright or inclined position relative to the floor, the suspension mounting of the rocker 1 on the shorter lever arms 8 moves over the dead centre, in which the suspension mounting 9 of the rocker lies vertically above the rollers 5 of the angle lever arrangement.

This swivel motion for lifting the rocker 1 is schematically shown in FIGS. 2 to 4 in successive positions. In FIG. 2 the rocker 1 is pushed laterally onto a bed roller (not shown) such that it partly encompasses this in its lower peripheral areas. Then the activating lever 2 (not shown in FIGS. 2 to 4) is swivelled towards the floor such that the frame part 4 is correspondingly swivelled, whereby the frame parts 4 then move forward on the rollers 5 and then, in the position shown in FIG. 3, reach a position in which they lie vertically precisely under the suspension mounting 9 of the rocker 1 on the shorter lever arms 8. In this position the weight force acting on the rocker no longer causes torque or angular momentum on the activating lever. If the activating lever is swivelled out beyond this dead centre, the measuring foot reaches the stable end position represented in FIG. 4 in which it lies on the one hand on the rollers 5 and on the other hand on a further bearing point, stable on the floor. The stability of the position depends on how far the suspension mounting 9 of the rocker 1 is moved out beyond the dead centre if the second bearing point comes to rest on the floor. The arrangement should be designed such that the dead centre is exceeded by a sufficient angular amount such that the activating lever 2 cannot be lifted unintentionally as a result of careless contact which, as a result, would cause a movement back into the starting position with the bed roller on the floor.

The measuring foot represented in FIG. 1 has two frame parts 4, which are provided with rollers 5 at their lower ends. The frame parts 4 are connected at their upper ends by a frame crossbar 6 onto which the weighing cell (not shown) is screwed. A bridge part 3 is in turn screwed onto the weighing cell, one of the shorter lever arms 8 being attached onto each end of the bridge part 3.

Figure 5:
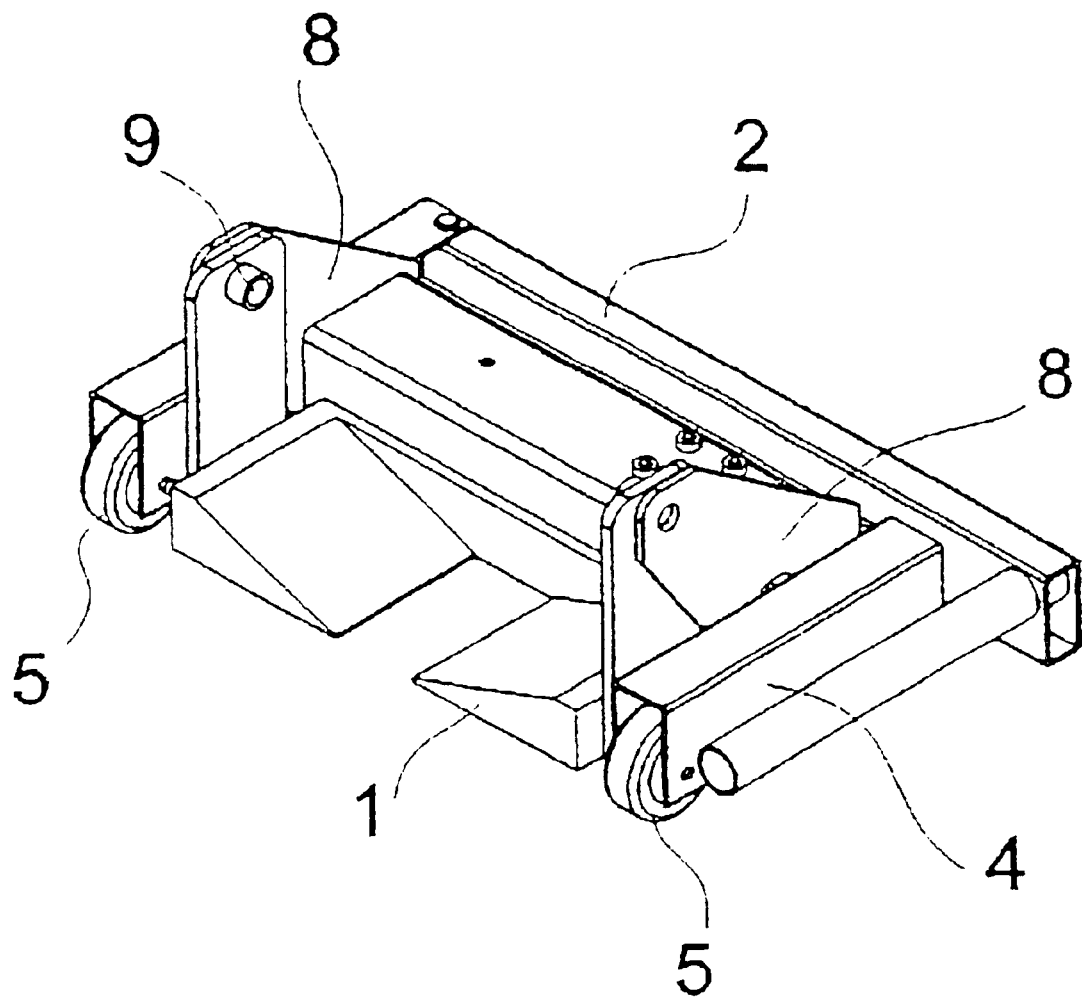
FIG. 5 shows a schematic perspective representation of the measuring foot from FIG. 1 in the lifted position and with folded activating lever.

One of the frame parts 4 is provided with an activating lever 2 which practically represents an extension of the frame part. The activating lever 2 is attached to the frame part 4 so that it can be pivoted with respect to the frame part in a plane perpendicular to its actual activation direction, such that it can be folded after the lifting of the measuring foot, as represented in FIG. 5, such that the projecting activating lever 2 presents no danger to the staff.

Also provided in the measuring foot is the weighing cell which picks-up a signal which represents the weight force acting on the rocker 1. The weighing cell can be arranged for example between the bridge part 3 and the frame crossbar 6 and thus deliver a measurement for the weight force bearing on the rocker 1.

In order to use the bed scale each measuring foot is pushed against a bed roller by advancing the activating lever 2 on the rollers 5 such that each rocker 1 accommodates a bed roller. By pressing down of the activating lever 2 the rollers 5 are pushed towards and underneath the rocker 1, and the rocker 1 lifted thereby with the bed roller. When the rollers 5 are moved out over the dead centre in which the rollers 5 lie vertically exactly below the force-initiation point or below the suspension mounting 9 of the rocker 1, the weight presses on the measuring foot into the stable end-position or measuring position on the floor (see FIG. 4).

What is claimed is:

1. Bed scale having a plurality of measuring feet each of which can support one leg of the bed and is provided with force transducer which delivers a signal representing the weight force acting on the measuring foot, and an evaluation device which is connected to transmission devices in the measuring feet for receiving up the signals and is prepared to deliver based on the signals and is prepared to deliver based on the signals of the measuring feet a result dependent on the weight force bearing thereon, characterized in that each measuring foot has an angle lever arrangement displaceable on the floor on sliding elements (5), which swivellably bears at a shorter lever arm (8) a rocker (1) which can be pushed laterally onto a leg of the bed standing on the floor to engage it, the angle lever arrangement and the suspension mounting of the rocker (1) being arranged such that, upon pressing-down of the activating lever (2), the rocker (1) is lifted and its suspension mounting (9) can be moved out beyond the dead centre in which the suspension mounting (9) of the rocker (1) lies vertical above the sliding elements (5) of the angle lever arrangement.

2. Bed scale according to claim 1, characterized in that the sliding elements of the angle lever arrangement are formed by rollers (5).

3. Bed scale according to claim 1, characterized in that the rocker is shaped such that it can be laterally pushed onto a bed roller standing on the floor to accomodate it.

4. Bed scale according to claim 3, characterized in that the rocker (1) of each measuring foot has two opposing wedge-shaped supports which are held at a distance from each other such that the rocker with the two wedge-shaped supports can be pushed under a bed roller standing on the floor and in the process the wedge-shaped supports encompass parts of the circumference of the bed roller from underneath.

5. Bed scale according to claim 1, characterized in that the force transducer of each measuring foot is formed by a weighing cell which senses the pressure caused by the weight on the rocker (1) on the shorter lever arm (8).

6. Bed scale according to claim 2, characterized in that the rollers of the angle lever arrangement are located at a distance from each other and leave free between each other space which is so great that the rocker can swivel between the rollers of the angle lever arrangement.

7. Bed scale according to claim 6, characterized in that the angle lever arrangement of each measuring foot has two frame parts (4) lying at a distance form each other each of which supports at the lower ends a roller (5), a frame cross bar 96) connecting the frame parts (4) at their opposite end, two shorter lever arms (8), which are connected to a bridge part (3) at its opposite ends and, at their ends facing away from the bridge part (3), bear the rocker (1) in the suspension mounting (9), and an activating lever (2) extending from at least one of the frame parts (4), the bridge part (3) being connected via a force transducer to the frame crossbar (6).

8. Bed scale according to claim 1, characterized in that the activating lever is foldable in a direction perpendicular to its activation plane.

* * * * *